March 12, 1940.  R. MIOLLIS  2,193,462
METHOD FOR MAKING CHEESE
Original Filed June 12, 1937   3 Sheets—Sheet 1
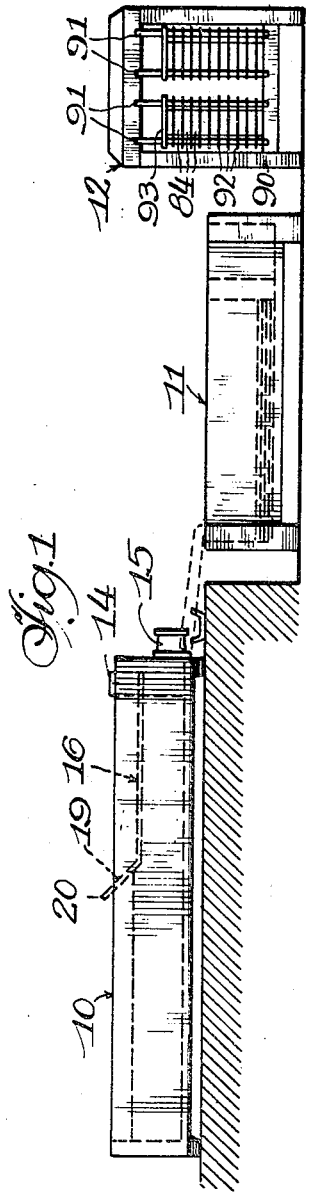
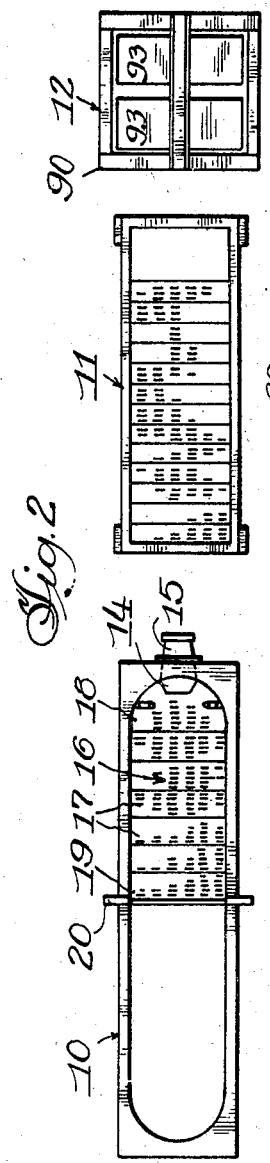
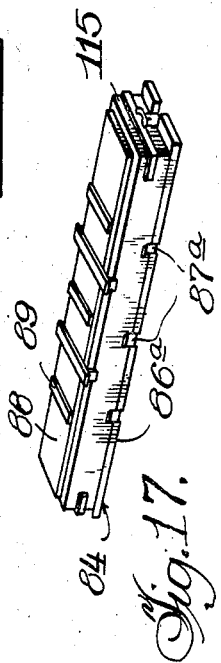
Inventor,
Raymond Miollis,

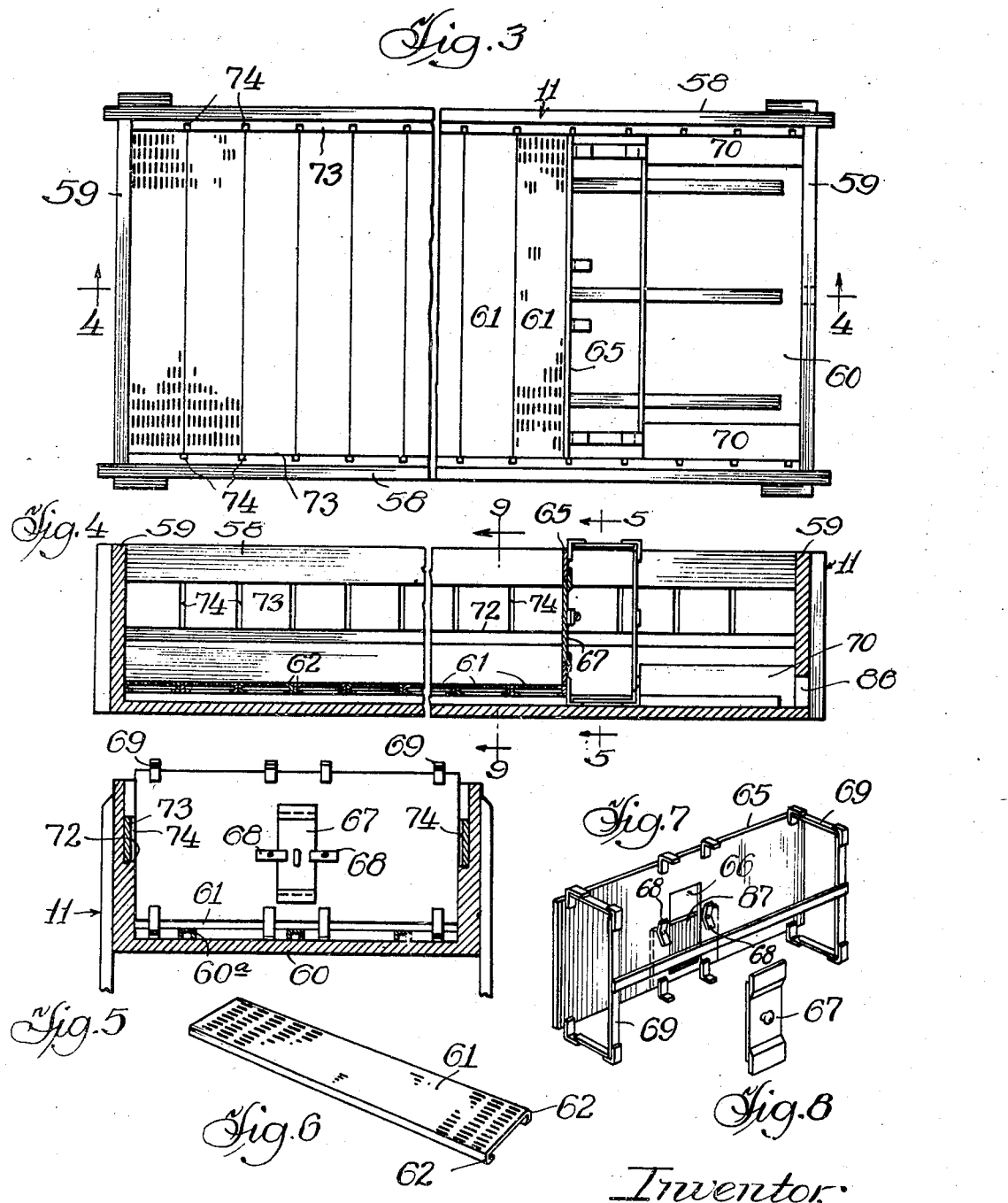

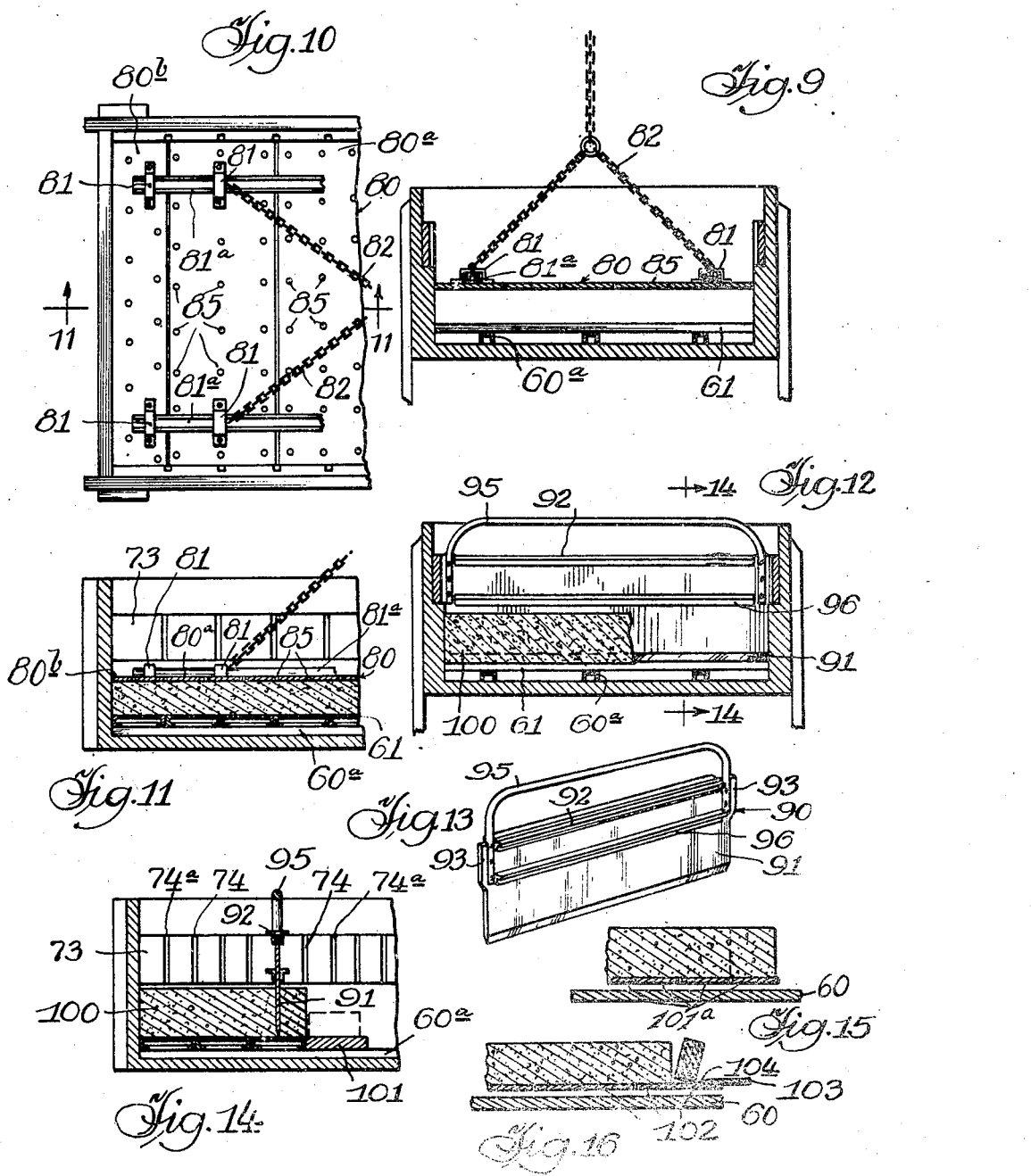

Patented Mar. 12, 1940

2,193,462

UNITED STATES PATENT OFFICE 2,193,462

METHOD FOR MAKING CHEESE

Raymond Miollis, Chicago, Ill.

Original application June 12, 1937, Serial No. 147,837. Divided and this application June 11, 1938, Serial No. 213,142

5 Claims. (Cl. 31—89)

REISSUED
JUN 17 1941

This invention relates to improvements in methods for cheese-making, and has for its principal object to provide a new and improved method for making a natural cheese so that it can be cut economically into commercial package sizes, and particularly in rectangular forms of substantially uniform size and weight.

The present application is a continuation in part of my Patent No. 2,103,545 issued December 28, 1937, and a division of my co-pending application, Serial No. 147,837, filed June 12, 1937, but the claims hereof are directed to the process or method of cheese-making broadly disclosed in said Patent No. 2,103,545 and said co-pending application.

In carrying out my improved method of cheese-making, I provide an improved form of apparatus adapted for handling batches of 10,000 pounds of milk, more or less to be made into individual commercial size packages of uniform shape and weight as small as a few ounces each. Said apparatus includes as its principal elements a cheese vat, a molding vat cheese molds and a cheese press. The cheese vat may be similar to the ordinary cheese vats in which the usual curd-forming and draining processes are carried out, but is also provided with improved means for initially removing the whey from the vat. The molding vat is of novel form and utility in my improved process. It is provided with special means for pressing and further draining the whey from the batch and for cutting the batch into relatively large rectangular blocks of uniform size, extending the full width of the molding vat. Cheese molds may also be provided for receiving and forming these long blocks in final compact form of uniform shape and size while under pressure, in a cheese press.

The invention may best be understood by reference to the accompanying drawings, in which Fig. 1 is a side view of the main elements of my apparatus including the cheese vat, molding vat and cheese press.

Fig. 2 is a plan view of the elements shown in Fig. 1.

Fig. 3 is a fragmentary plan view of the molding vat showing the end plate and the cheese trays therein.

Fig. 4 is a longitudinal section of the molding vat taken on line 4—4 of Fig. 3.

Fig. 5 is a detail section taken on line 5—5 of Fig. 4.

Fig. 6 is a perspective detail of one of the individual cheese trays used in the molding vat.

Fig. 7 is a perspective view from the rear of the end frame also used in the molding vat.

Fig. 8 is a detail perspective view of the removable gate used with the end frame shown in Fig. 7.

Fig. 9 is a transverse section taken on line 9—9 of Fig. 4, but showing the pressing plate applied to the top of a batch of cheese contained in the molding vat.

Fig. 10 is a fragmentary plan view of the molding vat with the pressing plate applied thereto.

Fig. 11 is a detail section taken on line 11—11 of Fig. 10.

Fig. 12 is a detail section similar to Fig. 9 but with the pressing plate removed and the cheese knife inserted in the molding vat for cutting blocks of cheese therein.

Fig. 13 is a perspective view of one of the cheese knives removed from the molding vat.

Fig. 14 is a longitudinal section taken on line 14—14 of Fig. 12 and showing the method in which the cheese may be cut into elongated, transversely extending slabs and removed from the molding vat.

Figs. 15 and 16 are fragmentary detail views illustrating alternative methods of cutting the cheese and removing it from the molding vat in the form of elongated, transversely extending slabs.

Fig. 17 is a perspective view of a molding form in which the blocks are pressed.

Referring now to the details of the apparatus shown in the drawings, the cheese vat indicated generally at 10 in Figs. 1 and 2 may be of the usual form heretofore employed in making natural cheese and adapted to receive milk or cream in large quantities to be treated bacteriologically in the usual manner, depending upon the nature or type of cheese to be made. It will be understood that with older methods of natural cheese-making most of the operations—including the initial draining, initial matting or pressing of the curds, and the cutting of the batch into substantially square individual blocks—were all carried on within the cheese vat itself. In the present invention, I utilize the cheese vat only for mixing and forming the curds and initially draining the whey from the curds, after which the batch is transferred to a separate molding vat, where it is further pressed and formed into elongated blocks of uniform size and weight, as will hereinafter more fully appear.

The several details of the cheese vat 10 are specifically described in my Patent No. 2,103,545 previously referred to. Only the principal elements need here be pointed out, namely, a suitable strainer 14 at one end of the vat communicating with a discharge spout 15 having any suitable form of closure or gate therein, and if desired, a removable top screen 16 which may be placed over the curds adjacent the discharge end of the vat so as to press downwardly on the curds and retain them while permitting the whey to escape from the top of the batch and escape at one end thereof. In the form shown, the top screen 16 is formed of a plurality of similar sections 17, 17 extending transversely of the interior of the cheese vat, and also having an end plate 18 substantially semicircular in shape so as to closely fit within the curved end of the cheese vat adjacent the strainer 14 as clearly shown in Fig. 2. The sections 17, 17 may be of wire mesh, or plates otherwise perforated, and are preferably hinged to each other and to the edge of the end plate 18. A free end section 19 of the top screen may be suitably supported on the edge of the vat as by means of a cross bar 20.

After the free whey has been sufficiently drained from the batch in the vat 10, the curds while still in a semi-solid condition are transferred to the molding vat indicated generally at 11 in Figs. 1 and 2. This vat consists of a rectangular receptacle of somewhat smaller capacity than the cheese vat 10 and arranged to receive the batch from said cheese vat after the whey has been initially drained therefrom.

In the form shown in detail in Figs. 4 and 5, the molding vat has side walls 58, end walls 59 and an integral horizontal bottom 60, on which is disposed a plurality of removable trays or platforms 61, 61 placed crosswise inside the molding vat. In the form shown in detail in Fig. 6, each of these trays is made of sheet metal, with a suitable porous upper surface, herein provided by perforations, and having flanged side margins 62, 62 which rest on suitable bars 60ª, 60ª disposed longitudinally of the vat bottom. The trays 61 thus form in effect a false bottom for the vat.

A removable end plate 65 also fits within one end of the vat abutting one end of the series of trays, and is provided with a centrally disposed slot 66 through which the whey may be drained. The slot may be suitably closed by a plate 67 detachably secured to the exterior face of the end plate, as by pivoted lugs 68, 68 on the rear face of said end plate. The end plate has a pair of rectangular supporting frames 69 at its rear face, and is suitably held in place by a plurality of blocks 70, 70 inserted between the frames 69 and the adjacent end wall 59 of the vat, as shown in Figs. 3 and 4.

Along each side wall 58 of the vat I provide a ledge or shoulder 72 disposed intermediate the top and bottom of the vat, which ledge is adapted to support a removable upright spacing board 73. Two similar spacing boards are provided along opposite sides of the vat. A plurality of upright grooves 74 are formed therein at equal distances along each of said boards. These grooves serve as spacing guides for the cheese knives shown in Fig. 13, as will hereinafter more fully be described. It will be observed further that the positions of the several pairs of spacing grooves 74, 74 register with the abutting margins of each adjacent pair of trays at the bottom of the vat.

After the batch of partially drained curds has been transferred from the cheese vat 10 into the molding vat, as by discharging said batch through a suitable trough indicated in dotted lines in Fig. 1, the batch is first subjected to a pressing operation by means of a large metal plate 80 which may be made up of several sections 80ª, 80ᵇ assembled together in abutting relation by means of metal eyes or loops 81 pressed over longitudinal tie bars 81ª, 81ª. Said pressing plate is of the same width as the vat, but its length depends upon the position of the end plate 65 which can be varied, depending upon the size of the batch. The pressing plate is normally suspended in horizontal position by means of suitable cables or chains 82, 82 connected to the tie bars 81ª, and arranged so that said plate may be lowered bodily upon the top of the batch in the vat.

When the batch is first placed in the molding vat, it usually is in a sufficiently fluid state to settle with a perfectly level upper surface, and the plate is lowered into the vat and freed so as to rest by its own weight on the batch, in parallel relation with the bottom of the vat at all times.

The pressing plate 80 is preferably perforated as indicated at 85, 85 so as to permit the whey to escape upwardly through said plate as it presses upon the batch, and pass outwardly through the gate opening 66 in end plate 65. As a preferred means of maintaining the end face of the batch substantially smooth where it abuts the end gate 65, the cheesemaker will find it especially convenient to insert a relatively thin sheet of metal 87 over the opening 66 between the batch and the end plate 65, as indicated partly in dotted lines in Fig. 7. Said sheet is arranged so its upper edge is substantially level with the top of the batch. The closure plate 87 may then be removed from the rear face of the end plate, leaving the slot 66 open for whey to drain therethrough. The whey may also escape through and around the perforated trays 61 at the bottom of the vat, and from thence escape through a suitable discharge opening 86 at the end of the vat.

In the preferred form of pressing plate shown in Figs. 10 and 11, it will be noted that the several sections 80ª and 80ᵇ have their margins coinciding with the grooves 74 formed in the spacing boards 73 and registering with one or more of the trays 61 at the bottom of the vat. Certain sections 80ª toward the center of the vat may be made wide enough to span a plurality, say, two of said adjacent grooves, while an end section 80ᵇ is the width of one tray 61. The sections 80ª and 80ᵇ are removably mounted on the tie bars 81ª, 81ª by the eyes 81, 81, so that one or more of said sections can be removed or added, depending upon the position of the end gate 65. Thus, the single unit end section 80ᵇ of the plate may or may not be used, as required by the number of trays in use in the vat.

Under most conditions the weight of the metal plate 80 will be sufficient to press most of the whey from the batch, although, of course, it will be understood that additional pressure may be applied thereto by auxiliary means, if desired.

The batch is preferably subjected to drainage under pressure, as described, until it is in a substantially solid state, or at least having sufficient coherence or body that it can hold its shape while being cut into blocks and transferred into pressing or molding forms. When this stage is reached, the pressure plate 80 is removed, and the batch is then cut into elongated blocks by means of the cheese knives 90, 90, one of which is shown in Fig. 13. Two such knives are used, each being as long as the vat is wide, and having their blades 91 slightly higher than the thickness of the mass of cheese to be cut. Above each blade 91 is a reinforcing plate 92 which includes extending ends 93, 93 which are adapted to fit into the spacing grooves 74, 74 formed in the boards 73, 73 at opposite sides of the molding vat, as previously described. Each cheese knife also has suitable handles or bails 95 and longitudinal reinforcing strips 96, 96.

The two cheese knives may be operated in the following manner:

The first knife is placed on the first pair of spacing grooves 74 nearest the end plate 65 in the molding vat, and pressed downwardly so as to cut the first block of cheese from the batch, as indicated in Fig. 12. The end plate 65 is removed from the vat, and this first block of cheese may then be raised on its separate bottom tray 61 and removed from the vat. The first knife is left in the first groove so as to retain the remaining body of curds at its proper level, and the second knife is then placed in the next adjacent groove to cut the second block of cheese. The first knife is then removed and immediately placed in the third groove to cut the third block of cheese. The second block of cheese may then be removed on its respective tray 61.

Fig. 14 shows a modified arrangement of spacing grooves formed in the boards 73, 73 at opposite sides of the molding vat, wherein intermediate spacing grooves 74ª, 74ª may also be provided to cut each block defined by the width of an individual tray 61, into two equal halves. This arrangement is helpful where it is desired to cut the cheese blocks into smaller sections before removing them from the molding vat.

Under some conditions it may be desired to transfer the blocks of cheese immediately to other boards or trays, in which case a plain board as indicated at 101 in Fig. 14 may be placed in the vat adjacent the tray 61 upon which the last or end block rests, and the entire block may be tilted or flopped over on its outer corner so as to be transferred to the board 101 for removal from the vat, as indicated in dotted lines in this figure.

Fig. 15 illustrates a modified form of apparatus in which plain solid boards 101ª are substituted for the perforated trays 61. In such case, of course, the adjacent edges of the boards are spaced apart sufficiently to permit drainage from the batch to the bottom of the vat, but without permitting escape of the curds.

Fig. 16 illustrates a further modification of the apparatus wherein the false bottom of the vat is made up of plain boards 102, 102 that are not necessarily the same width as the cheese blocks, and the cheese blocks, instead of being removed on individual trays, may be removed from the vat by inserting an auxiliary tray 103 having a tapered edge 104. The auxiliary tray is disposed flatwise on the top of boards 102, and each block as it is cut is tilted or flopped over onto the auxiliary tray 103, so as to be independently supportable thereby as is clearly indicated in this figure. It will thus be seen that in each of the several alternative operations illustrated in connection with Figs. 4, 14, 15 and 16, a plurality of individual cheeses are formed and are independently supported for final removal from the vat.

In cases where the cheese is to be pressed before curing, the cheese blocks are each put in a suitable pressing mold or mold form 84 such as is disclosed in my Patent No. 2,103,545. Said mold forms each comprise an open frame 115, a bottom board 86ª with said cleats 87ª engaging the adjacent outer margins of the frame, and a top board 88 which fits snugly in the side and end walls of the open frame so as to be telescoped therein when subjected to pressure in the cheese press. Cross bars 89 may be secured to the upper surface of the top board as shown, to increase the amplitude of telescoping movement of the top board while in the press.

It is usually preferable to turn or invert the cheese blocks in the mold forms 84 several times to permit thorough drainage of the cheese before finally placing the mold forms in the press.

The cheese press, indicated generally at 12 in Figs. 1 and 2, has a framework 90 and including two sets of upright guide bars 91, 91 on each set of which is mounted a plurality of horizontally disposed plates 92 slidably mounted on said guide bars. The individual cheese molds 84 are inserted between each adjacent pair of plates and between the topmost plate and a relatively heavy superimposed pressing member or plate 93. In this position the superimposed weight of the apparatus is exerted with increasing pressure upon the several cheeses stacked in the press. Although the pressure on the cheeses on the bottom will be somewhat greater than those near the top, it is understood that in practice it is desirable to turn or invert the cheeses several times during the pressing operation, and at the same time the cheesemaker may transpose or rotate the relative positions of the several cheeses so as to expose them all to substantially equal aggregate pressure during the pressing operation.

Certain soft types of cheese do not require pressing, but are ready to be cured shortly after they are removed from the molding vat. But in either case, the cheese is preferably molded and cured in the form of an elongated slab of substantially the same length as when it is removed from the molding vat. The fact that cheeses are handled during molding and curing in such relatively large blocks or slabs renders all the handling of the cheese easier and quicker, as two men can handle such slabs during the molding, pressing and curing operations much more readily than a larger number of small cheeses. When the cheese is ready for market, it may be cut into any size desired.

Although I have shown and described certain embodiments of my invention, it will be understood that I do not wish to be limited to the exact construction shown and described, but that various changes and modifications may be made without departing from the spirit and scope of my invention as defined in the appended claims.

I claim as my invention:

1. The method of making natural cheese, which comprises treating a relatively large batch of milk or the like to form curds, while partially draining the whey therefrom, transferring the batch to a molding vat, horizontally supporting a plurality of portions of said batch in said vat, applying pressure uniformly distributed on the top surface of said batch to express whey from said batch to reduce it to a semi-solid mass of uniform thickness, and cutting said batch to form blocks of uniform shape and size while the said portions are so supported to thereby form a plurality of individual and independently supportable cheeses.

2. The method of making natural cheese, which comprises treating a relatively large batch of milk or the like to form curds and partially draining the whey therefrom, pouring the batch by gravity while in a semi-fluid state directly to a station for a molding operation, horizontally supporting a plurality of portions of said batch while gravitationally applying pressure uniformly distributed on the top surface of said batch to express whey from said batch to reduce it to a semi-solid mass of uniform thickness, and cutting through said mass to form separate portions of uniform shape and size while the said portions are thus horizontally supported, to thereby form a plurality of individual and independently supportable cheese blocks.

3. The method of making natural cheese, which comprises treating a relatively large batch of milk or the like to form curds, transferring the batch to a station for a molding operation, horizontally supporting a plurality of portions of said batch, applying gravitationally only pressure uniformly distributed on the top surface of said batch to express whey both from the top and bottom thereof to reduce it to a semi-solid mass of uniform thickness, and cutting said batch transversely while the said mass is thus horizontally supported, to form a plurality of individual and independently supportable portions of uniform shape and size.

4. The method of making natural cheese, which comprises treating a relatively large batch of milk or the like to form curds, while partially draining the whey therefrom, pouring the batch into a station for a molding operation, horizontally supporting a plurality of portions of said batch while applying pressure uniformly distributed on the top surface of said batch to express whey from said batch to reduce it to a semi-solid mass of uniform thickness, and cutting said batch while said portions are so supported to form a plurality of individual and independently supportable cheeses.

5. The method of making natural cheese, which consists in treating a batch of milk or the like in a vat to form curds, and partially draining the whey therefrom, transferring the batch to a molding vat, horizontally supporting adjacent portions of said batch individually in said molding vat while providing marginal indications between said individually supported portions, applying pressure uniformly distributed on the top surface of said batch to express whey therefrom to reduce it to a semi-fluid mass of uniform thickness, cutting said batch along planes including said marginal indications to form blocks of uniform shape and size, removing individual portions with their respective individual supports from said vat, and separating said portions from their supports.

RAYMOND MIOLLIS.